Nov. 16, 1971   J. L. THOUSAND   3,620,184
CROSS-COUNTRY AMPHIBIOUS UTILITY VEHICLE
Filed June 9, 1969   2 Sheets-Sheet 1

INVENTOR.
JOHN L. THOUSAND
BY
Warren H. Kinzinger
ATTORNEY

Nov. 16, 1971   J. L. THOUSAND   3,620,184
CROSS-COUNTRY AMPHIBIOUS UTILITY VEHICLE
Filed June 9, 1969   2 Sheets-Sheet 2

INVENTOR.
JOHN L. THOUSAND
BY
ATTORNEY

United States Patent Office 3,620,184
Patented Nov. 16, 1971

3,620,184
CROSS-COUNTRY AMPHIBIOUS UTILITY VEHICLE
John L. Thousand, 1600 Lincoln Lane,
Newport Beach, Calif. 92660
Filed June 9, 1969, Ser. No. 831,661
Int. Cl. B63f 3/00
U.S. Cl. 115—1         5 Claims

ABSTRACT OF THE DISCLOSURE

A cross-country amphibious vehicle with a flotation hull equipped with a plurality of propulsion wheels at each side on rotatably mounted unsprung wheel spindles. The vehicle drive system from an engine to, ultimately, the propulsion wheels is through a differential to opposite side drives and with a brake on the drive output from each side of the differential for vehicle steering as individually actuated by the operator and for braking when both are simultaneously actuated.

---

Figure 1:
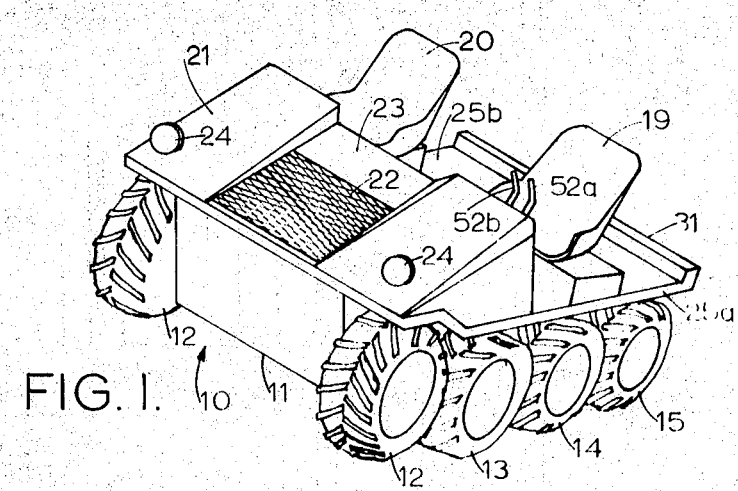

This invention relates in general to cross-country vehicles, and in particular, to a multi-propulsion wheeled amphibious vehicle having a fixed unsprung suspension system and mechanical drive inter-linking of the propulsion wheels of each side.

Cross-country utility vehicles face many stringent operational requirements imposed through use objectives in, for example, road building, site construction, oil exploration, mining, pipeline installation, utility maintenance, forest fire service, ranching, crop spraying, and patrolling duties. A vehicle with such operational capabilities is also a natural for sportsmen and recreational utilization. These various uses require a very unusual terrain capability over abrupt obstacles with an above the terrain projection surmounting ability. It is highly desired that overall ground pressure be very low while high vehicle stability be maintained when chasms, gullies, and high projecting obstacles are encountered and surmounted that would be unsurmountable for many machines. Dropping of wheels into holes without tractive effort should be eliminated, or, at least, minimized. Further, it is important that wheel articulation present with many suspension systems be eliminated and that savings in maintenance and equipment expense be achieved. Steering and braking control are also important considerations with off highway cross-country vehicle utilization along with, an ability to traverse streams, ponds, and rivers as an amphibian in achieving a highly desired utility capability expansion inherent with such abilities.

It is, therefore, a principal object of this invention to provide a cross-country utility vehicle having a plurality of traction propulsion wheels rotatably mounted in fixed position front to rear relation along opposite sides of the vehicle and with mechanical positive drive inter-linking of the propulsion wheels of each side.

Another object with such a cross-country utility vehicle is to provide a combined brake and positive steering control system with selective braking of the drive systems to the opposite sides of the vehicle.

A further object with such a cross-country vehicle is to protectively enclose the drive system substantially completely within a vehicle body structure.

Still a further object is that such a cross-country vehicle be amphibious with the vehicle body structure a substantially water tight flotation hull.

Features of this invention useful in accomplishing the above objects include, in a cross-country amphibious vehicle, an all metal welded hull providing, along with the wheels, buoyancy for vehicle float in water with operational forward propulsion movement therethrough, with rated loads, maintained as driven by the low pressure flotation tires on the propulsion wheels. Tires have been used that advantageously employ a chevron type tread with the first pair of road wheels reversed for greater propulsion tread effort thereby when they are brought into driving engagement with the terrain. This is with the first pair of road wheels mounted approximately five to six inches above the plane of mounting of the remaining propulsion wheels. There are four wheels on each side of the vehicle in relatively closely spaced front to rear relation with all on a side mechanically drive inter-linked and with the lead wheel on each side clearing the ground surface when the vehicle is resting on or in operation over a relatively flat surface. An engine and drive system with a differential along with the opposite drives to the wheel mounting spindles of opposite sides of the vehicle are contained within the flotation hull.

A brake is provided for each drive output from the differential to respective sides of the vehicle for steering control when selectivity actuated and vehicle braking when simultaneously fully braked. This steering control is with the wheels on one side being caused to slow in rotation and with the mechanical linkage through the differential causing the wheels of the opposite side to correspondingly reactively rotate at increased speed. Obviously, sharpest turning is attained with wheel rotation on one side braked to a halt and the wheels on the other side being rotated at maximum speed consistent with differential input rotative speed and output to the driving side. The drive of each side includes two roller chain drive sections both driven from a sprocket assembly on the differential output driven shaft of that side with one chain drive section driving the forward two wheels and the other the rear wheels for that side of the vehicle. Further, the flotation hull is clean and generally free of protusions and formed with a bottom longitudinally extended obstruction clearance channel, Even so, the engine, transmission and other drive components are, generally, positioned quite low in the hull with, as a result, the vehicle center of gravity being, advantageously, very low. This combined with a relatively wide track provides side slope operation capabilities with slopes so steep that the vehicle would normally tend to slide down the slope before, and without, tipping over. A passenger and freight carrying top deck is provided along with an engine enclosure and passenger shield, with a cooling air system thereunder with air flow from front to rear, and with the top deck lateral extension providing vertical fender overcover for the low pressure flotation tires.

A specific embodiment representing what is presently regarded as the best mode of carrying out the invention is illustrated in the accompanying drawings.

Figure 2:
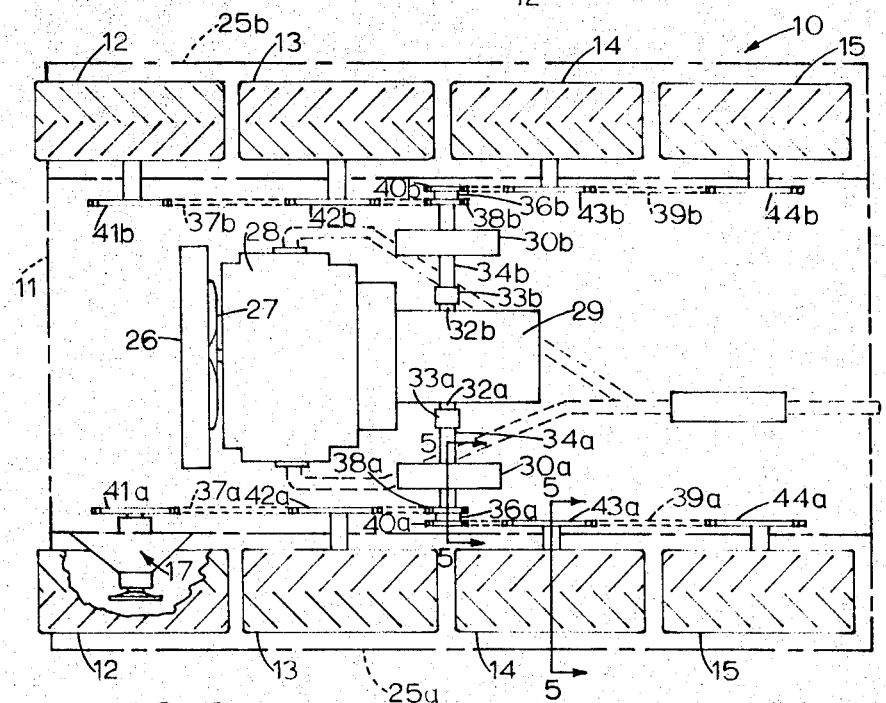
Figure 3:
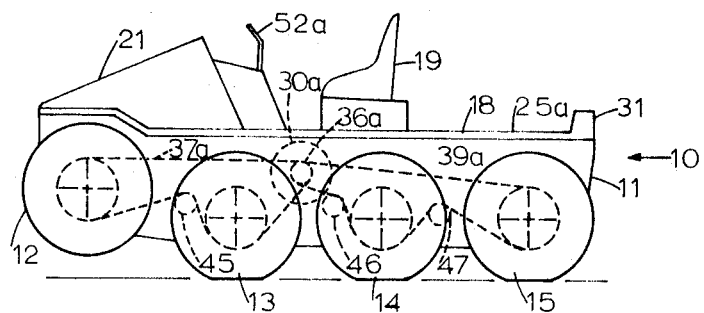
Figure 4:
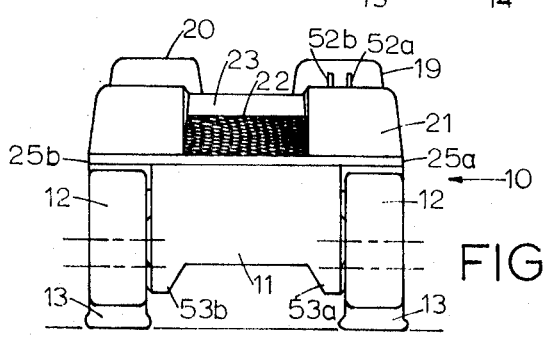

In the drawings:

FIG. 1 represents a front perspective view of applicant's eight propulsion wheeled cross-country amphibious utility vehicle;

FIG. 2, a top plan view with portions not shown, hull and hull top outlined in phantom, and part broken away to show drive engine and drive train detail;

FIG. 3, a side elevation view of the vehicle with some of the drive system detail shown by dotted lines;

FIG. 4, a front elevation view of the vehicle; and

Figure 5:
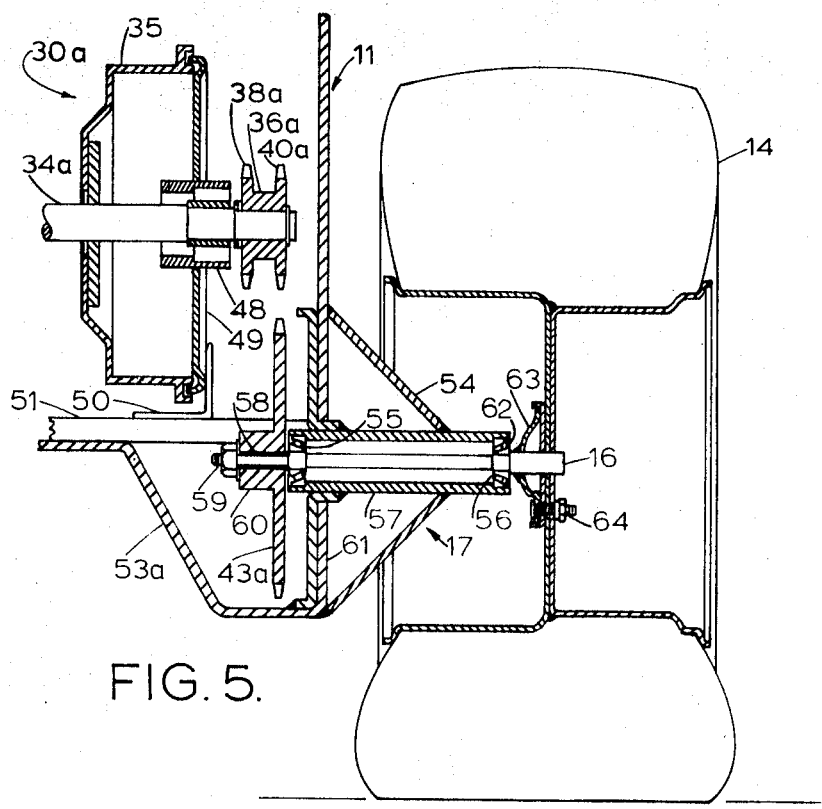

FIG. 5, a partial broken away composite sectioned view taken along both 5—5 lines of FIG. 2 through the brake and drive sprocket for one side; and through the driven sprocket for a wheel, the associated wheel spindle mounting assembly, and the wheel driven therethrough.

Referring to the drawings:

The cross-country amphibious utility vehicle 10 of FIGS. 1 through 4 is shown to be an eight wheeled propelled vehicle with four wheels on each side of a water tight hull 11. The wheels mount low pressure type flotation tires and, include on each side a leading wheel 12 followed successively by relatively closely longitudinally spaced wheels 13, 14, and 15 all mounted in a fixed unsprung suspension system. This is with the wheel drive spindles 16 each rotatably mounted in a wheel bearing support fixed position unsprung structure 17, shown in greater detail in FIG. 5, and with the rotational centers of the rearward wheels 13, 14 and 15 common to the same plane. Both forward wheels 12 are mounted approximately five to six inches higher than the other wheels to clear the surface when the vehicle is resting on a flat surface as shown in FIGS. 3 and 4. It is interesting to note that chevron treaded tires have been employed as shown in FIGS. 1 and 2, to advantage particularly with the front tires 12 reversed. This is to facilitate effective tractive engagement with obstacles, when encountered by the front wheels, in pulling of the vehicle up and over the obstacles. Further, the higher placement of the leading wheels 12 tends to generally lessen shock of impact as obstacles are encountered with forward travel of the vehicle. The usual point of contact of the front wheels 12 with obstacles gives support therefrom cantilevered a substantial distance ahead of the following wheels. For example, when a ditch is being traversed the leading set of wheels 12 tend to advantageously bridge the gap and engage the opposite bank thereby tending to have the vehicle bridge the ditch and minimize going down through ditches.

The vehicle 10 is provided with a top cargo or freight deck (or platform) 18 that is a top enclosure for the vehicle hull upon which an operator's seat 19 is mounted along with, if desired, a passenger's seat 20. The top deck 18 extends from a forward relatively elevated engine component cover and passenger front shielding structure 21 including an air inlet grilled 22 hatch 23 that may be readily opened for engine compartment servicing. Two head lamps 24 are mounted at opposite forward sides of the engine cover and shielding structure 21. Further, the top deck 18 has two opposite side lateral extensions 25a and 25b providing vertical fender overcover for the wheels 12 through 15. The vehicle cooling and ventilating air flow system includes air inlet grill 22 engine radiator 26, engine driven fan 27 for drawing cooling air from the grill 22 through radiator 26 and over engine 28 down through the hull 11 and by the transmission 29 and across brakes 30a and 30b to ultimately be discharged through raised laterally extended outlet vent 31 at the rear of top deck 18. This air ventilation system provides for good ventilation of the hull and excellent safety against gaseous accumulation explosion. The outlet vent 31 also helps retain freight on the top deck 18 from sliding off the rear. Further, the drive and steering control braking system vital components are so enclosed within the vehicle flotation hull 11 as to be protected from the exterior effects of water, mud, dirt, rocks and vegetation encountered by the vehicle.

Referring particularly to FIG. 2 the engine 28 drives a multiple speed transmission 29 including a differential therewith (detail not shown) having opposite side drive output shafts 32a and 32b connected by shaft couplings 33a and 33b to opposite side propulsion drive shafts 34a and 34b. Brakes 30a and 30b have brake drums 35 fixed to the respective drive shafts 34a and 34b for rotation therewith (refer also to FIG. 5) with the shafts extended through the brakes 30a and 30b to outer end mounted two section compound drive sprockets 36a and 36b. Front drive section roller drive chains 37a and 37b are driven by the inner sprocket wheels 38a and 38b, respectively, and rear drive section roller drive chains 39a and 39b are driven by outer sprocket wheels 40a and 40b, respectively, of the compound drive sprockets 36a and 36b. This is with drive chains 37a and 37b driving two wheel sprockets each that is sprockets 41a and 42a and 41b and 42b, respectively, of the forward wheels 12 and 13 of the respective sides of the vehicle. The rear drive section roller drive chains 39a and 39b each drive two wheel sprockets 43a and 44a and 43b and 44b respectively, of the rearward wheels 14 and 15 of the respective sides of the vehicle. Please note that sprocket chain take up idlers 45, 46 and 47 are provided on each side for adjusting the tension in the drive chains 37a, 37b, 39a and 39b and to facilitate drive chain installation and removal.

The outer portion of drive shafts 34a and 34b adjacent and just inside drive sprockets 36a and 36b are each supported by a roller bearing assembly 48 mounted in a brake plate (or spider) 49 fixed in place on internal vehicle framing members 50 and 51 shown in FIG. 5. The brake plate 49 supports the brake shoes and internal brake actuating mechanism of standard construction (detail not shown). Thus, the brake plate 49 functions not only as a mounting support for the bearing 48 but also to absorb torque reaction from the braking system in its mounting on vehicle framing. Hand operated levers 52a and 52b activate hydraulic cylinders (not shown) for selective actuation of brakes 30a and 30b. This provides for steering by varying the relative drive speeds of the left-hand and right-hand sets of vehicle ground wheels with one brake for the left set of wheels and the other for the right set of wheels. When the brake on the drive train to a given side is operated, the wheels on that side are thereby slowed in rotation and by inherent reaction through the drive differential the opposite side set of wheels are caused to rotate at a correspondingly increase velocity. This provides a very effective measure of steering control. Full application of the brake on one side stops rotation of the wheels of that side and the opposite side set of wheels then rotate at a maximum spin rate consistent with transmission speed input to the differential. Simultaneous actuation of both broke hand levers 52a and 52b provides effective braking for the vehicle. This is with brake drums 35 secured to the drive shafts 34a and 34b selectively engaged by a mechanical braking system of standard construction not shown in detail upon actuation of the braking and steering centrol levers 52a and 52b by the operator. A conventional foot operated clutch (not shown) is provided for clutching engine torque delivery to transmission 29 subject to speed selection by a gear range selection control lever (also not shown). Vehicle speed control is provided via a foot operated accelator system (detail not shown).

The flotation all metal welded hull 11 completely encloses all the mechanically interacting drive components of the vehicle other than the drive wheels. Further, the engine 28 transmission 29 and other drive components are placed relatively low in the hull 11 thereby achieving a very low vehicle center of gravity. This along with a relatively wide track advantageously results in a vehicle side slope capability of operation on slopes so steep that the vehicle normally slides down the slope before tending to tip over. The hull 11, serving also as a main body and frame structure, is water tight and formed with an upward raised bottom longitudinally front to rear extended ground and terrain obstruction clearance channel bordered by hull side depending wheel drive portions 53a and 53b (see FIGS. 4 and 5). Generally, the hull 11 underside is completely clean along with almost all of the hull exterior surfaces.

Referring again particularly to FIG. 5 a metal cone 54 as an extension of hull 11 is provided for each of the propulsion wheels much the same as shown for wheel 14. Cone 54 contributes to support of the wheel 14 via spaced inboard and outboard tapered roller bearings 55 and 56, respectively, rotatably mounting stub axle spindle 16 within axle tubular housing 57 that is rigidly mounted in fixed unsprung position in cone 54 and the side wall of hull 11. In the drive chain 39a drive for wheel 14 please note that wheel sprocket 43a is mounted for rotation with axle spindle 16 through cooperating splines 58 and held in place thereon by axle end thread and nut assembly 59. Wheel sprocket 43a is in alignment with outer sprocket wheel 40a for common drive and driven engagement with drive chain 39a along with wheel sprocket 44a in the same alignment. Please note that all the sprocket wheels 41a, 41b, 42a, 42b, 43a, 43b, 44a and 44b are all duplicates, one of the other, with an elongated hub section 60. Further, the sprocket wheels for the forward two wheels on each side are reversed in their mounting from that of the rear two wheels on each side on the respective axle spindles 16 for alignment with the inner sprocket wheels 38a and 38b, respectively, and drive through the drive chains 37a and 37b. The hull wall 61 and cone 54 welded wheel mounting structure also includes a seal 62 at the outer bearing 56 for sealing against the entry of foreign material such as dust, water and dirt. Note also that air passage is provided through the inner wheel bearing 55 for venting of the space within axle tubular housing 57 between bearings 55 and 56 to the interior of hull 11. During vehicle operation heat is generated with rotation of the axle and axle bearings 55 and 56 heating air within the axle tubular housing 57 and causing it to expand with some air flow through bearing 55 to the interior of hull 11. Conversely when the vehicle is driven into water or mud a sudden cooling of the axle structure may occur with cooling of air within the axle tubular housing 57 causing a resulting contraction thereof and return flow of air from the interior of hull 11 through bearing 55. Obviously, this insures venting of air to and from the cleaner air environment of the hull interior and minimizes or eliminates air pressure change working of axle seal 62 and the drawing of moisture or dirt thereby. Each axle spindle 16 is provided with a hub flange 63 for mounting the wheel as by bolt assemblies 64 in conventional manner.

Thus there is hereby provided a vehicle advantageously combining cross-country mobility and maneuverability generally associated with track laying vehicles with the relative simplicity and the durability of rubber tire wheeled vehicles. With operation over very rough or badly eroded terrain the vehicle with its fixed suspension, relatively closely longitudinally front to back spaced wheels and large low pressure tires generally operates across the high levels or peaks of the terrain. This is with the wheels in contact with the surface providing the forward tractive effort and with the wheels in between the peaks of the terrain not dropping down into the holes, ruts or other depressions in the terrain being traversed other than to the extent permitted by greater deflections of those tires in contact with the ground. This eliminates power loss experienced with conventional articulating and/or sprung suspension systems with wheels following the contour of the terrain and when dropping into holes imposing power requirements for climbing such hole dropped wheels out again. Further, since all wheels of each respective side are mechanically drive inter-linked those wheels in ground contact are automatically provided with the tractive force from the engine required to propel the vehicle. The wheels that are not in contact with the ground at any particular time continue to rotate at the same speed as the wheels of the same side in contact with the ground surface with no power loss thereby or through needless speed up of suspended wheels. The improved wheel mounting and suspension and positive drive system enables vehicle climb over obstacles that for an ordinary vehicle are impossible to surmount and with this ability enhanced by the raised position of the leading wheel on each side. Still further, with relatively close longitudinal spacing of the wheels a superb vehicle ability is attainted in ease of climbing across obstacles such as logs and rocks and with problems of hang up between wheels being advantageously at a reasonably practical minimum.

Whereas this invention is here illustrated and described with respect to a specific embodiment thereof, it should be realized that various changes may be made without departing from the essential contributions to the art made by the teachings hereof.

I claim:

1. In a cross-country vehicle: an enclosed longitudinally front to rear extended body structure having opposite sides; a plurality of vehicle propulsion wheels rotatably mounted in a fixed position longitudinally spaced front to rear relation on each of the opposite sides of said body structure in a fixed unsprung suspension system; drive means for each side of the vehicle mechanically inter-linking the plurality of vehicle propulsion wheels; said drive means for each side divided into drive sections operatively connected to different propulsion wheels of the respective drive sections of the respective sides of the vehicle; prime mover means drive connected through drive train means to said drive means of each side of the vehicle; with said prime mover means, said drive train means, and said drive means at each side for the vehicle propulsion wheels all protectively enclosed within said body structure; wherein, each of said drive means for each side of the vehicle is divided into a forwardly-extended drive section, and a rearwardly-extended drive section from a common drive shaft in said drive train means for each side extended laterally to rotary drive means driving said drive sections from a common drive center; with propulsion wheels mounted in the forward drive section of the vehicle driven by said forwardly extended drive sections of the respective sides; with propulsion wheels mounted in the rearward drive section of the vehicle driven by said rearwardly extended drive sections of the respective sides; each of said drive sections includes a drive chain driven sprocket at each driven propulsion wheel; with the two drive chains of a side driven by a chain drive sprocket assembly, mounted on the outer end of the respective common drive shaft for that side, as said common drive center for that side of the vehicle; a rotatably mounted wheel spindle is provided for each of said propulsion wheels in a rigidly mounted axle enclosure with the drive chain driven sprocket for each respective propulsion wheel mounted on the inner end of the wheel spindle for that wheel; with a propulsion wheel mounted on the outer end of each of said wheel spindles; bearing support means is provided in each of said rigidly mounted axle enclosures for the wheel spindle rotatably mounted therein; seal enclosure means is provided between said axle enclosures and said wheel spindles outboard from said bearing support means on each said axle enclosure; with said body structure being a substantially water-tight flotation hull; said bearing support means for each of said wheel spindles includes spaced apart inboard and outboard bearing sections; and, provision of air passage means from the air space between the bearing sections supporting each wheel spindle to the interior of the vehicle hull.

2. In a cross-country vehicle: an enclosed longitudinally front to rear extended body structure having opposite sides; a plurality of vehicle propulsion wheels rotatably mounted in a fixed position longitudinally spaced front to rear relation on each of the opposite sides of said body structure in a fixed unsprung suspension system; drive means for each side of the vehicle mechanically interlinking the plurality of vehicle propulsion wheels; said drive means for each side divided into drive sections operatively connected to different propulsion wheels of the respective drive sections of the respective sides of the vehicle; prime mover means drive connected through drive train means to said drive means of each side of the vehicle; with said prime mover means, said drive train means, and said drive means at each side for the vehicle propulsion wheels all protectively enclosed within said body structure; wherein, each of said drive means for each side of the vehicle is divided into a forwardly-extended drive section, and a rearwardly-extended drive section from a common drive shaft in said drive train means for each side extended laterally to rotary drive means driving said drive sections from a common drive center; with propulsion wheels mounted in the forward drive section of the vehicle driven by said forwardly-extended drive sections of the respective sides; with propulsion wheels mounted in the rearward drive section of the vehicle driven by said rearwardly-extended drive sections of the respective sides; each of said drive sections includes a drive chain driven sprocket at each driven propulsion wheel; with the two drive chains of a side driven by a chain drive sprocket assembly, mounted on the outer end of the respective common drive shaft for that side, as said common drive center for that side of the vehicle; a rotatably mounted wheel spindle is provided for each of said propulsion wheels in a rigidly mounted axle enclosure with the drive chain driven sprocket for each respective propulsion wheel mounted on the inner end of the wheel spindle for that wheel; with a propulsion wheel mounted on the outer end of each of said wheel spindles; bearing support means is provided in each of said rigidly mounted axle enclosures for the wheel spindle rotatably mounted therein; seal enclosure means is provided between said axle enclosures and said wheel spindles outboard from said bearing support means on each said axle enclosure; with said body structure being a substantially water-tight flotation hull; said flotation hull is provided with a passenger seat mounting and freight carrying top deck; a forward relatively elevated prime mover overcover enclosure and passenger front shield structure; a cooling and ventilating air flow system including, an air inlet grill at the front of said prime mover overcover enclosure and passenger front shield structure, a prime mover fan drawing air in, insuring air flow over the prime mover and on through the flotation hull, and a hull back outlet vent traversing substantially the lateral extent of the rear of the top deck of the vehicle.

3. The cross-country vehicle of claim 2 wherein, low pressure flotation tires are mounted on each of said propulsion wheels; and with said top deck extended laterally to provide substantially vertical fender overcover for said low pressure flotation tires.

4. The cross-country vehicle of claim 3 wherein, said vehicle is an eight wheel vehicle with the three rearward wheels of both sides mounted with their rotational centers substantially common to the same plane; with the forward wheel of each of the two sides mounted with the rotational centers thereof on substantially the same rotational axis displaced above the common plane of the other six wheels; with the low pressure flotation tires being chevron tread tires; and with the first pair of said tires reversed for greater traction engagement when brought into contact with terrain during operation of the vehicle.

5. The cross-country vehicle of claim 4 wherein said propulsion wheels are relatively closely longitudinally spaced center to center back to front with only relatively little nominal clearance between adjacent tires on each side; with said flotation hull being clean and generally free of protrusions and formed with an upward raised bottom longitudinally front to rear extended ground and terrain obstruction clearance channel.

References Cited
UNITED STATES PATENTS

| | | | |
|---|---|---|---|
| 2,821,949 | 2/1958 | Uyehara | 180—23 X |
| 3,161,172 | 12/1964 | Kassbohrer | 115—1 |
| 3,180,305 | 4/1965 | Gower-Rempel | 115—1 |
| 3,444,837 | 5/1969 | Donofrio | 115—1 |

ANDREW H. FARRELL, Primary Examiner